United States Patent [19]

Jeffers et al.

[11] Patent Number: 5,239,435
[45] Date of Patent: Aug. 24, 1993

[54] LAMINATED MAGNETIC RECORD/PLAYBACK HEAD WITH THIN FILMS OF HIGH PERMEABILITY MATERIAL SPACED APART BY VERY THIN FILMS OF INSULATING MAGNETIC MATERIAL FOR HIGH BIT DENSITIES AND DATA TRANSFER RATES

[75] Inventors: Frederick J. Jeffers, Escondido; Neil Smith, San Diego, both of Calif.

[73] Assignee: Eastman Kodak Company, Rochester, N.Y.

[21] Appl. No.: 674,011

[22] Filed: Mar. 25, 1991

[51] Int. Cl.$^5$ .................. G11B 5/147; G11B 5/133
[52] U.S. Cl. .................................................. 360/126
[58] Field of Search ..................... 360/125, 126, 127

[56] References Cited

U.S. PATENT DOCUMENTS

| | | | |
|---|---|---|---|
| 4,754,354 | 6/1988 | Jeffers | 360/113 |
| 4,769,729 | 9/1988 | Kumasaka et al. | 360/126 |
| 4,799,118 | 1/1989 | Yamada et al. | 360/125 |
| 4,814,921 | 3/1989 | Hamakawa et al. | 360/126 |

OTHER PUBLICATIONS

Journal of Crystal Growth, Nade et al, "High . . . Targets", vol. 45, 1978, pp. 361-364.

Primary Examiner—Robert S. Tupper
Attorney, Agent, or Firm—Dennis P. Monteith; William W. Holloway

[57] ABSTRACT

A thin film magnetic record/playback head having suitably thin layers of soft, high permeability magnetic material, such as permalloy, electrically insulated from each other by very thin layers of a magnetic material having suitably high resistivity, such as NiZn ferrite. The improved magnetic record/playback head is capable of reading and writing much higher bit densities (up to about 100 kfci) and at much higher frequencies (100 MHz or higher) than prior art devices while remaining fully compatible with existing electronic circuitry.

16 Claims, 2 Drawing Sheets

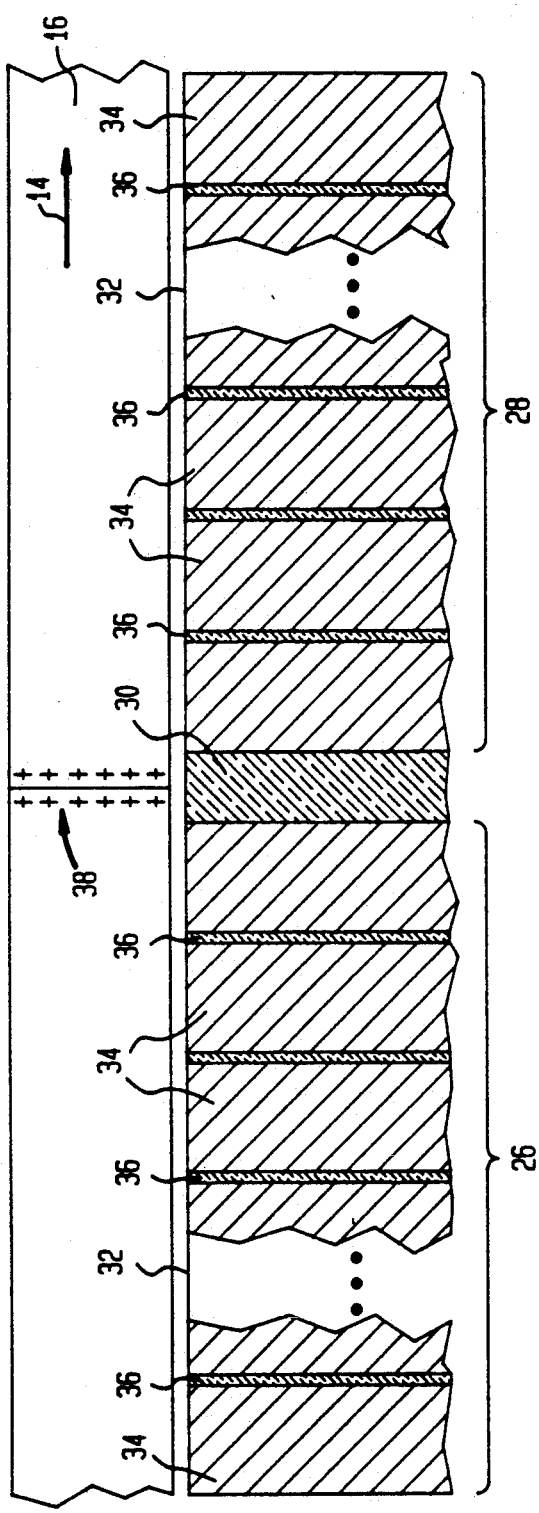
FIG. 3
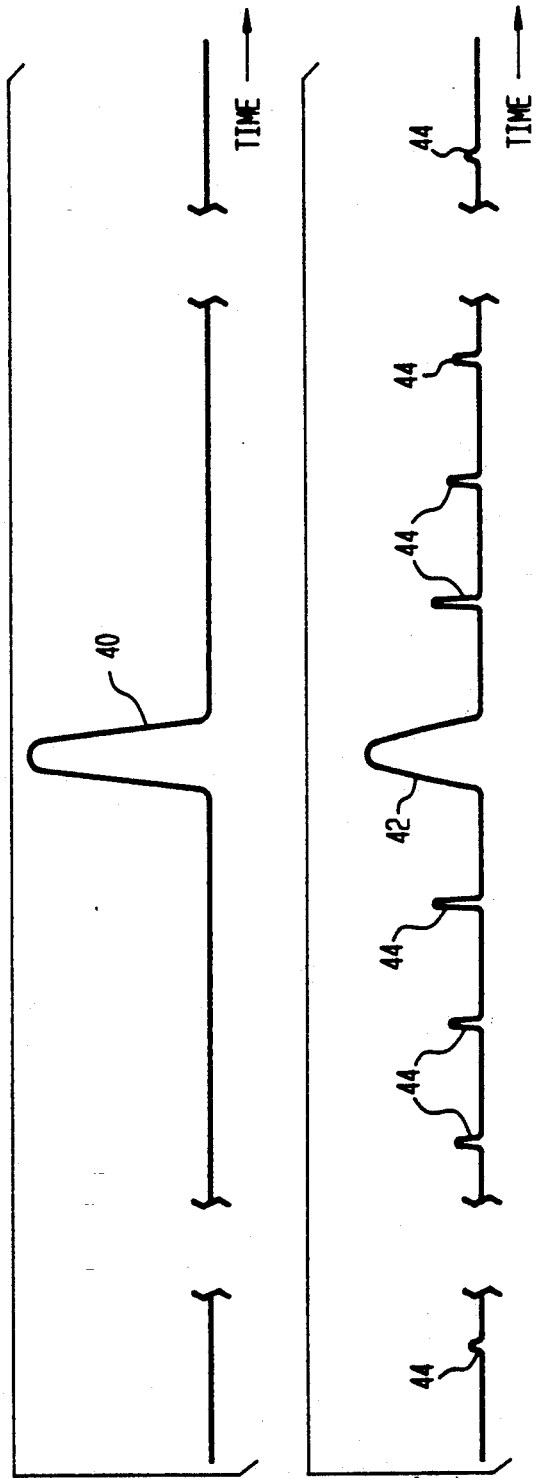
FIG. 4
FIG. 5 PRIOR ART

LAMINATED MAGNETIC RECORD/PLAYBACK HEAD WITH THIN FILMS OF HIGH PERMEABILITY MATERIAL SPACED APART BY VERY THIN FILMS OF INSULATING MAGNETIC MATERIAL FOR HIGH BIT DENSITIES AND DATA TRANSFER RATES

BACKGROUND OF THE INVENTION

1. Field of the Invention

The present invention relates to a magnetic record/playback head for digital data, and more particularly to an improved thin film magnetic record/playback head capable of response for bit densities as high as 100,000 flux changes per inch (100 kfci) and at frequencies of 100 megahertz and higher.

2. Description of the Prior Art

Thin film heads fabricated of magnetic core material such as permalloy offer significant improvements in permeability and frequency response, thus allowing higher data transfer rates. These core materials have higher saturation flux densities than do standard ferrites. This factor allows stronger fields to be used during recording and makes feasible the utilization of high coercivity recording media which is required for high linear density recording.

The low input inductance, write-current levels and playback voltages produced by these permalloy thin film designs are well suited to conventional read/write electronics. Therefore, to achieve higher data densities and transfer rates, it is desirable to extend the performance of the magnetic record/playback head without demanding a corresponding advance in electronics technology.

A bit density of 100 kfci means that each "bit" of data has a recorded length of only 10 microinches, or about 0.25 micron, an extremely short distance! To achieve such high density, it is necessary to provide a main gap between the pole pieces of the magnetic record/playback head of less than about 0.25 micron. In order for the head to provide good high frequency response, its pole pieces are made up of very thin layers of magnetically soft material, such as high permeability "permalloy". To suppress eddy currents and other undesirable effects (e.g., domain closures) these magnetic layers, which happen also to be highly conductive electrically, are separated from each other by electrically insulating spacer layers. In prior art devices these spacer layers have typically been made of silica ($SiO_2$), alumina, or similar highly insulating material, a few hundred Angstroms thick, which is about as thin as can be manufactured in practice without pin holes. It should be noted that each such spacer layer, thin though it is, has a significant thickness compared to a main head gap of only 0.25 micron (250 nanometers or 2500 Angstroms). Each such spacer layer is in effect a secondary magnetic gap in addition to the main gap of the magnetic record/playback head because materials such as $SiO_2$, while excellent electrical insulators, are also non-magnetic. Where there are a number of these spacer layers, their cumulative thickness may exceed that of the main head gap. This considerably reduces the efficiency of the main gap. As will be explained more fully hereafter, these secondary gaps have undesirably limited the high frequency and high density performance of prior magnetic record/playback heads. This problem is discussed in U.S. Pat. No. 4,799,118 in column 3 thereof.

SUMMARY OF THE INVENTION

In view of the foregoing, an object of the invention is to provide a thin film laminated magnetic record/playback head which provides significantly higher bit densities and operating frequencies than prior art devices.

This object is achieved by a magnetic record/playback head comprising a magnetic core and an electric coil encircling a portion of the core. The magnetic core has first and second pole piece portions which are spaced apart at one end from each other and define a main head gap therebetween for writing/reading high density bits on a magnetic medium. Each of the first and second portions of the core is a laminated structure of alternating thin layers of first and second materials. The first material of each portion is of high magnetic permeability. The second material of each portion is of high resistivity and substantial magnetic permeability such that the second material electrically isolates adjacent first material layers and results in electrical eddy currents in the core being suppressed, and the efficiency and high frequency response of the head is substantially improved.

The present invention provides a thin film magnetic record/playback head in which suitably thin layers of high permeability magnetic material, such as permalloy, are spaced electrically apart by very thin layers of an electrically insulating yet magnetic material, such as NiZn ferrite, which has both high volume resistivity and a magnetic permeability greater than about five. The non-conducting insulating layers minimize eddy current and other effects. But by virtue of the magnetic properties of the insulating layers, the secondary magnetic gaps found in prior thin film magnetic record/playback heads are substantially eliminated. This in turn means that the main head gap can now be made small enough (e.g. less than about 0.25 micron) to "write" and/or "read" data bits having a much higher density (e.g., 100 kfci) without loss of efficiency due to numerous secondary gaps and without the substantial degradation in high frequency response caused by unwanted signals from these secondary gaps.

As will be explained more fully hereinafter, the high frequency response of the magnetic record/playback head provided according to the invention is considerably improved. This in turn means that the transfer rate of the data being read can be made proportionally higher. An important advantage of this new magnetic record/playback head is that it is fully compatible with conventional electronic drive circuitry. Also the head can be fabricated with the precision and minute dimensions required. A number of such heads can easily be arranged side-by-side on very close centers to read and write a like number of similarly spaced tracks on a magnetic medium, such as standard half-inch-wide metal particle tape. Because of the improved high frequency performance of this new magnetic record/playback head, such a tape can be read at existing tape speeds, which are very high, even though bit density on the tape is increased by a factor of five or more over present densities.

These advantages, as well as other advantages of the invention, will become more apparent in the detailed description of a preferred embodiment presented below.

BRIEF DESCRIPTION OF THE DRAWINGS

FIG. 3 is a greatly enlarged cross-sectional view of the magnetic record/playback head, along the dashed lines 3—3 of FIG. 2, showing the individual layers of the head pole pieces and the main gap;

FIG. 4 shows schematically an electrical signal pulse generated in a head coil of the magnetic record/playback head of FIGS. 1, 2, and 3 as a data bit passes over the main gap of the head; and FIG. 5 shows schematically a prior art signal pulse along with undesirable secondary pulses which would be generated in the coil of a prior art head which uses non-magnetic insulating layers.

DETAILED DESCRIPTION OF A PREFERRED EMBODIMENT

Figure 1:
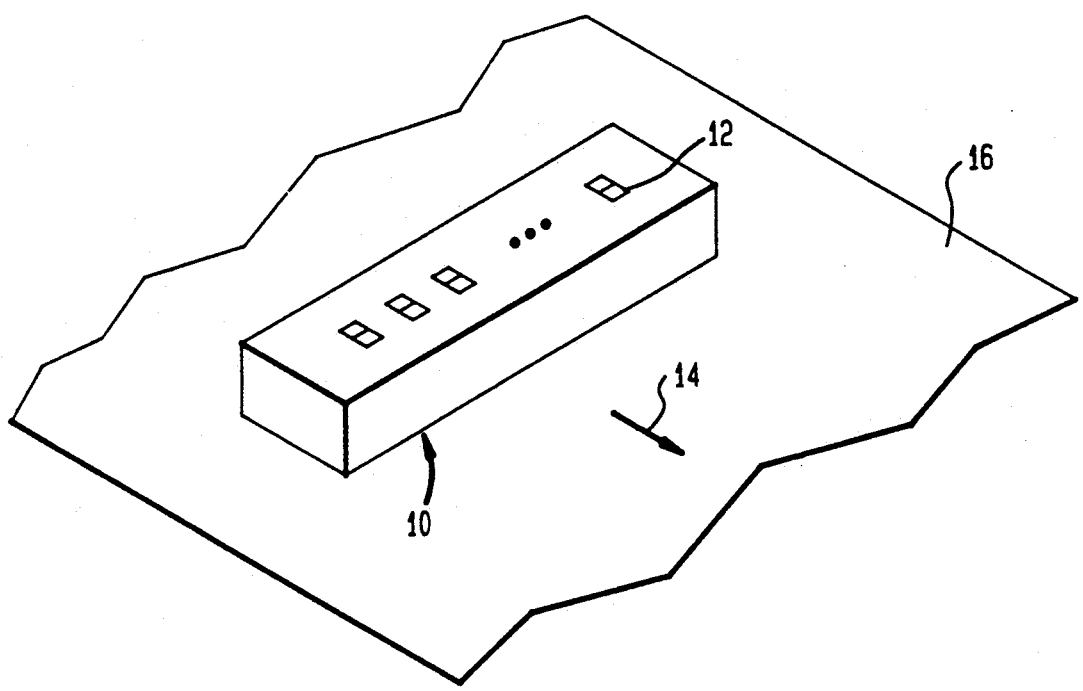
FIG. 1 is a schematic perspective view of a multiple-track magnetic record/playback head assembly, in accordance with the invention, showing its relationship to a magnetic recording medium.

Referring now to FIG. 1, there is shown in schematic form a multi-track magnetic head assembly 10 in which a plurality of individual thin film magnetic record/playback heads 12 are mounted in a lateral row in accordance with the present invention. The head assembly 10 may be mounted in an equipment frame (not shown) for relative movement at high speed in the direction shown by an arrow 14 past a magnetic medium 16, which may for example be a high coercivity metal particle tape. Alternatively, the head assembly 10 is mounted in a stationary position and the magnetic medium 16 is mounted for movement in the direction of the arrow 14 past the head assembly.

Figure 2:
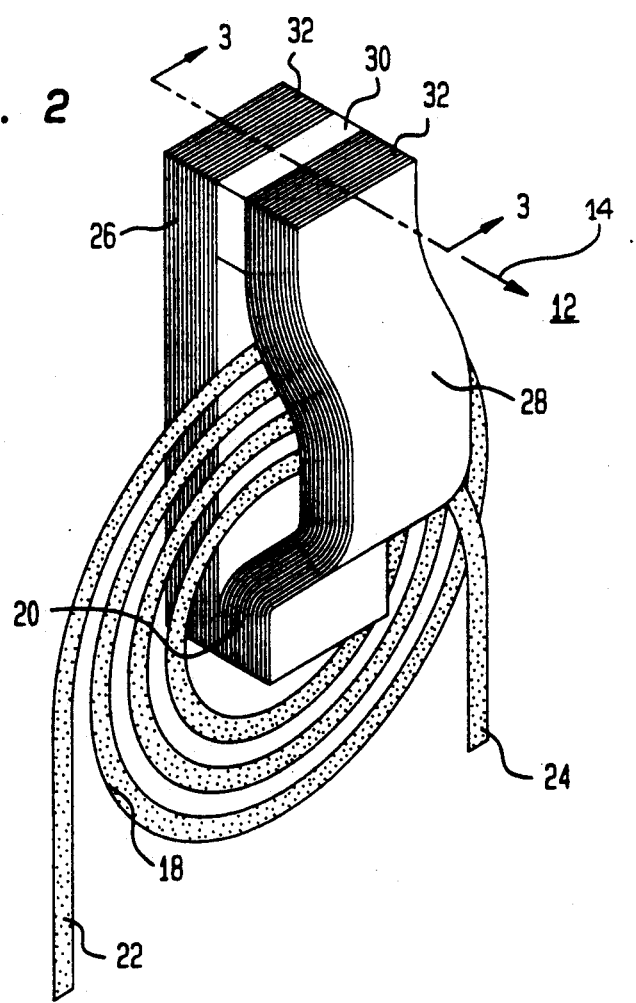
FIG. 2 is an enlarged perspective view, partly schematic, showing one of the magnetic record/playback heads of FIG. 1.

FIG. 2 shows a greatly enlarged partial view of one of the magnetic record/playback heads 12 of FIG. 1. Each head comprises an electric coil 18 which encircles a "Y like" magnetic core 20, and has input/output terminals 22 and 24 which are connected to electronic circuitry (not shown). Core 20 is made of a first pole piece 26 and a second pole piece 28 which are joined at their lower ends for magnetic continuity. The upper ends or tips of pole pieces 26 and 28 are closely spaced parallel to each other and define a main head gap 30. The length of the gap 30, which lies in the direction of the arrow 14, corresponds to the length of a data bit recorded on the tape 16 shown in FIGS. 1 and 3 (e.g., about 0.25 micron for 100 kfci). The width of the gap 30, corresponds to the width of a data track along the length of the tape 16. Because the dimensions of head 12 can be so minute, each head 12 is mounted side-by-side on very close centers in a row, as shown in FIG. 1, to read and record very closely spaced tracks on the tape.

The tips of pole pieces 26 and 28 are lapped to form a smooth planar surface 32. The depth of gap 30 below its top surface is advantageously left at about five microns because of manufacturing considerations. The length of each pole piece (the direction of arrow 14) should be about five microns to obtain adequate overwrite or re-recording on a 1500 Oe metal particle tape. The width of the tip of each pole piece 26 and 28 may for example be about ten microns. This permits a density of at least 1000 tracks per lateral inch on the tape.

FIG. 3 is a very greatly enlarged, partially broken away, cross-sectional view along the lines 3—3 of FIG. 2, with a portion of tape 16 passing closely above the surface 32. As seen here in FIG. 3, pole piece 26 and pole piece 28 of head 12, which are separated by gap 30, are each made up of a plurality of spaced apart thin layers 34. These layers 34 are advantageously made of 81/19 NiFe permalloy, a material which has high magnetic permeability and is particularly suited for thin film magnetic record/playback heads. However, this material is a metal alloy and highly electrically conductive. Now when the coil 18 of the magnetic record/playback head 12 is energized with a signal pulse of electric current, counter currents known as eddy currents are induced in the conductive portions of core 20, namely layers 34. These eddy currents are undesirable because they substantially decrease the efficiency of the head 12. For best efficiency in suppressing eddy currents, each conductive layer 34 should be no thicker than approximately twice the "electrical skin depth" at the frequency of consideration. This relationship between the electrical skin depth and frequency is given by the formula:

$$d = 1(2\pi)^{-1}(10^9 r/2 \; \mu f)^{\frac{1}{2}}$$

where
 d is the electrical skin depth in microns,
 r is volume resistivity (20 microhm-centimeter for permalloy),
 $\mu$ is magnetic permeability (2000 for permalloy), and
 f is frequency (Hertz).

For a frequency f of 100 MHz or $10^8$ cycles per second, the skin depth $$d = 1(2\pi)^{-1}[(10^9)(20 \times 10^{-6})/(2 \times 2000 \times 10^8)]^{\frac{1}{2}}$$
$$= 0.36 \text{ micron}$$

Therefore, for each pole piece 26, 28 to have a thickness of about five microns, there should be about seven layers 34 in each pole piece 26, 28.

The magnetic (metallic) layers 34 are, as shown in FIG. 3, electrically isolated from each other by very thin insulating layers 36. In accordance with the present invention, each of these insulating layers 36 is made of a material which is both magnetic and a good electrical insulator. Advantageously, layers 36 are made of NiZn ferrite having a thickness in the range from about 25 nm to 50 nm. This particular magnetic material has a high volume resistivity (e.g., millions of times greater than one ohm-cm), and a permeability greater than about five. Other ferrites, while having somewhat higher permeabilities, have resistivities in the semi-conductor range (e.g., about one ohm-cm) and are therefore unsuitable as insulating layers here.

Ferrite insulating layers 36 are preferably deposited over each permalloy layer 34 by a deposition process which does not raise the temperature of the workpiece above about 250° C. so as not to destroy the desirable magnetic properties of layers 34 and head 12. Such a process is disclosed in an article entitled "High Rate Deposition of Magnetic Films By Sputtering from Two Facing Targets" by M. Naoe et al., Journal of Crystal Growth, vol. 45 (1978), pages 361-364.

The gap 30 of head 12 is advantageously filled with $SiO_2$ (or similar non-magnetic insulating material) which is deposited to a desired thickness and sandwiched between the pole pieces 26 and 28. The fabrication of thin film magnetic record/playback heads in general is well known in the art and need not be described further.

FIG. 3 shows in schematic form magnetic tape 16 positioned closely above the surface 32 of pole pieces 26 and 28. The tape is adapted to be moved at high velocity in the direction of arrow 14 over and past the head gap 30. For the sake of illustration, a single positive magnetic transition representing a "bit" 38 recorded on tape 16, as is indicated by two rows of vertical "+" signs on the tape 16, is shown lying just above the gap 30. It is to be noted that the length of gap 30 is slightly less than the distance along the direction of arrow 14 to the next closest magnetic transition (not shown and being negative) representing another bit. As discussed previously, for the very high density of 100 kfci, each "bit" on the tape 16 has a spacing from the next "bit" of slightly less than 0.25 micron.

It should be noted here that for suppressing eddy currents at 100 MHz, each layer 34 has a thickness only slightly greater than that of the main gap 30. Because numerous conductive, magnetic layers 34 are required, as explained herein above, a number of insulating layers 36 is required to separate adjacent magnetic layers 34. Here, in the example given, the cumulative thickness of these very thin insulating layers 36 within each pole piece considerably exceeds the width of gap 30. But by virtue of the invention, the undesirable magnetic effects of this otherwise unavoidable condition are substantially reduced.

Because insulating layers 36 of head 12 are also magnetic, they may be made somewhat thicker than would otherwise be the usual practice. Thus by making these layers as thick as 50 nanometers (500 Angstroms), problems occurring in manufacturing, such as pin holes, can be avoided. Also the capacitive coupling between permalloy layers 34 is reduced by making layers 36 somewhat thicker, and this further helps in reducing eddy current effects.

Referring now to FIG. 4, there is shown an electrical pulse 40 which is generated in the coil 18 of the head 12 as a bit 38 moves at high velocity past the gap 30. Because eddy currents have been suppressed as a result of making layers 34 so thin, high frequency components of the pulse 40 are better preserved than prior art devices with the result that the pulse output signal is more nearly perfectly reproduced. Secondary pulses as a result of the bit 38 passing the physical gap of each insulating layer 36 are effectively suppressed because these layers 36 are also substantially magnetic.

Referring now to FIG. 5 there is shown an electrical pulse 42 and spurious (secondary) pulses 44 which are generated when insulating layers 36 are non-magnetic, as in prior thin film magnetic record/playback heads. Secondary pulses 44 occur as a bit 38 passes each successive physical gap of the non-magnetic layers 36 with decreasing amplitude as is shown. And the main pulse 42, produced by main gap 30, is substantially degraded in amplitude and sharpness. When all these pulses (main and secondary) from a continuous train of bits being read are added together, they become at some point so distorted that they cease to be distinguishable from one another. The head becomes unusable beyond a certain bit density and transfer rate. By contrast, the structure of the present invention permits a significant increase in bit density from about 10 to 20 kfci to about 100 kfci, and with a corresponding increase in data transfer rate.

It is to be understood that the embodiments described herein are illustrative of the general principles of the invention. Modifications may readily be devised by those skilled in the art without departing from the spirit and scope of the invention. For example, the layers 34 may be made of a magnetic material other than permalloy and the insulating magnetic layers 36 may be made of a suitable material other than nickel zinc ferrite. Moreover the thickness of head pole pieces 26, 28 and the number of the various layers in each may be changed in accordance with the performance requirements of the magnetic record/playback head 12.

What is claimed is:

1. A magnetic head comprising a laminated magnetic core defining a media-contact surface having a main transducing gap, characterized in that said laminated magnetic core comprises thin layers of a first material having a magnetic permeability very many times greater than unity alternating with even thinner layers of a second material of resistivity very much higher than one ohm-cm and magnetic permeability at least several times greater than unity, said second material electrically insulating said layers of the first material from each other so as to suppress eddy current effects and secondary magnetic gap effects caused by the physical separation of said layers of the first material.

2. The magnetic head of claim 1 wherein said first material is permalloy and said second material is nickel zinc ferrite.

3. A magnetic record/playback head comprising:
   a magnetic core having first and second pole piece portions spaced apart at one end from each other defining a main head gap therebetween for writing/reading high density bits of a magnetic medium;
   each of the first and second portions of the core being a laminated structure of alternating thin layers of a first material and thinner second layers of a second material;
   the first material of each portion having a magnetic permeability very many times greater than unity; and
   the second material of each portion being of a resistivity very much higher than one ohm-cm and of magnetic permeability of at least several times greater than unity such that the second material electrically isolates adjacent first material layers and results in electrical eddy currents in the core being suppressed, and efficiency and high frequency response of the head being substantially improved.

4. The magnetic record/playback head of claim 3 wherein:
   the first material of each portion is a vapor deposited soft, high permeability metal; and
   the second material of each portion is a substantially non-conducting, magnetic ferrite.

5. The magnetic record/playback head in claim 4 wherein:
   the first material is permalloy, and, the second material is NiZn ferrite deposited onto the first material at a temperature below about 250° C., whereby desirable high frequency magnetic characteristics of the core are maintained.

6. A high frequency thin film magnetic record/playback head comprising:
   first and second pole pieces, said pole pieces having tips closely spaced parallel to each other and defining a main head gap, lower ends of said pole pieces being joined for magnetic continuity;

each of said pole pieces having a plurality of thin layers of a magnetic first material having a magnetic permeability very many times greater than unity; and said layers being electrically insulated from each other by thinner layers of a second magnetic material having a magnetic permeability of at least several times greater than unity and a resistivity very much higher than one ohm-cm such that eddy currents are reduced and efficiency of the main gap is substantially maintained at sub-micron gap lengths.

7. The high frequency thin film magnetic record/playback head of claim 6 wherein said layers of the second material each have a volume resistivity of millions of times greater than one ohm-cm and a magnetic permeability greater than about five.

8. The high frequency thin film magnetic record/playback head of claim 7 wherein each layer of the first material has a resistivity of about 20 microhm-cm and a permeability of about 2000.

9. The high frequency thin film magnetic record/playback head of claim 8 wherein each layer of the first material is about one-half micron thick, and each layer of the second material has a thickness in the range from about 25 nm to 50 nm, said main head gap being only about one-quarter micron in length.

10. A magnetic record/playback head comprising a pair of pole pieces defining a main head gap, each pole piece comprising a plurality of thin permalloy layers having an electrical skin depth at a predetermined high frequency of operation, and a similar plurality of insulating layers of magnetic material which are thinner than the permalloy layer and have a permeability greater than about five and a resistivity millions of times greater than one ohm-cm such that eddy currents and other effects are reduced, efficiency of said main gap is substantially maintained, and high frequency high bit density performance of the head is substantially improved.

11. The magnetic record/playback head of claim 10 wherein each of said permalloy layers has a thickness of about twice the electrical skin depth.

12. A magnetic record/playback head suitable for use at frequencies of about 100 MHz and bit densities as high as 100 kfci, the magnetic record/playback head comprising:

a pair of pole pieces defining a main head gap, each pole piece comprising a plurality of permalloy layers each of which is a fractional part of a micron thick, and a plurality of insulating layers of magnetic ferrite material which are thinner than the permalloy layers and are spaced between the permalloy layers and which have a permeability greater than about five and a volume resistivity millions of times greater than one ohm-cm.

13. The magnetic record/playback head of claim 12 wherein said magnetic ferrite is nickel zinc ferrite, and each zinc ferrite layer has a thickness up to about 50 nm.

14. A thin film magnetic record/playback head comprising:

a pair of pole pieces having ends which are parallel to each other to define a main head gap having a width, depth, and length;

each of said pole pieces being laminated of thin magnetic layers of a first material having a magnetic permeability very many times greater than unity;

each of said magnetic layers of the first material being electrically insulated from an adjacent layer by an insulating layer of a second magnetic material which is thinner than the layer of the first material and which has a magnetic permeability of at least several times greater than unity and a resistivity millions of times greater than one ohm-cm, said layers of the second material serving to suppress eddy currents and to substantially reduce secondary magnetic gap effects thereby supporting efficiency of said main gap such that the head is able to read high bit densities at high frequencies.

15. The thin film magnetic record/playback head of claim 14 further comprising:

a low inductance coil surrounding a portion of a least one pole piece, whereby said head is adapted to be driven by conventional electronic circuitry and is able to write on high coercivity metal particle magnetic media at a bit density of about 100 kfci and at a frequency greater than about 100 MHz; and the main gap has a depth of about five microns, and a length of less than about 0.25 micron, the thickness of each pole piece being about five microns.

16. The thin film magnetic record/playback head of claim 15 in further combination with a plurality of said heads mounted in an assembly on closely spaced centers in a lateral row, the width of the pole pieces of each head being about 10 microns, such that a plurality of very closely spaced tracks on a magnetic medium can be recorded or read simultaneously and at very high speed.

* * * * *